United States Patent
Van Lunteren (10) Patent No.: US 9,043,264 B2
(45) Date of Patent: May 26, 2015

(54) SCANNING DATA STREAMS IN REAL-TIME AGAINST LARGE PATTERN COLLECTIONS

(71) Applicant: International Business Machines Corporation, Armonk, NY (US)

(72) Inventor: Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 13/714,910

(22) Filed: Dec. 14, 2012

(65) Prior Publication Data
US 2014/0172766 A1    Jun. 19, 2014

(51) Int. Cl.
G06N 5/02        (2006.01)
G06F 17/00       (2006.01)
G06F 9/44        (2006.01)
G06N 5/04        (2006.01)
H04L 12/701      (2013.01)

(52) U.S. Cl.
CPC .............. *G06F 9/444* (2013.01); *G06N 5/047* (2013.01); *H04L 45/00* (2013.01)

(58) Field of Classification Search
None
See application file for complete search history.

(56) References Cited

U.S. PATENT DOCUMENTS

| | | | | | |
|---|---|---|---|---|---|
| 5,414,704 | A | * | 5/1995 | Spinney | 370/389 |
| 5,598,410 | A | * | 1/1997 | Stone | 370/469 |
| 6,128,296 | A | * | 10/2000 | Daruwalla et al. | 370/389 |
| 6,167,047 | A | * | 12/2000 | Welfeld | 370/389 |
| 6,453,380 | B1 | * | 9/2002 | Van Lunteren | 711/5 |
| 7,493,412 | B2 | * | 2/2009 | Herkersdorf et al. | 709/238 |
| 8,503,332 | B2 | * | 8/2013 | Luo et al. | 370/254 |
| 2005/0132342 | A1 | * | 6/2005 | Van Lunteren | 717/143 |
| 2006/0095588 | A1 | * | 5/2006 | Van Lunteren | 709/246 |
| 2007/0282573 | A1 | * | 12/2007 | Fritz et al. | 703/2 |
| 2007/0283300 | A1 | * | 12/2007 | Fritz et al. | 716/4 |
| 2009/0055343 | A1 | * | 2/2009 | Van Lunteren | 706/48 |
| 2009/0307175 | A1 | * | 12/2009 | Francesco et al. | 706/48 |
| 2010/0312742 | A1 | * | 12/2010 | Atasu et al. | 706/48 |
| 2011/0029473 | A1 | * | 2/2011 | van Lunteren | 706/47 |
| 2012/0195208 | A1 | * | 8/2012 | Abel et al. | 370/252 |
| 2012/0203729 | A1 | * | 8/2012 | Biran et al. | 706/48 |
| 2012/0203730 | A1 | * | 8/2012 | Biran et al. | 706/48 |
| 2012/0203754 | A1 | * | 8/2012 | Biran et al. | 707/706 |

(Continued)

OTHER PUBLICATIONS

Lunteren et al., "Designing a Programmable Wire-Speed Regular Expression Matching Accelerator", Dec. 5, 2012, Mircoarchitecture (MICRO), 2012 45th Annual IEEE, pp. 461-472.*

(Continued)

*Primary Examiner* — Jeffrey A Gaffin
*Assistant Examiner* — Paulinho E Smith
(74) *Attorney, Agent, or Firm* — Cantor Colburn LLP; Daniel Morris (57) ABSTRACT

Embodiments of the disclosure include a method for partitioning a deterministic finite automaton (DFA) into a plurality of groups. The method includes selecting, with a processing device, a subset of the plurality of states and mapping each state of the subset onto a group of the plurality of groups by assigning one or more transition rules associated with each state to a rule line of the group, wherein each rule line is assigned at most two transition rules and an extended address associated with one of the at most two transition rules. The method also includes iteratively processing each state of the subset mapped onto the group by removing the extended address from each rule line in the group with transition rules referring to a current state if the transition rules in the rule line branch within the group.

18 Claims, 8 Drawing Sheets

(56) References Cited

U.S. PATENT DOCUMENTS

| | | | |
|---|---|---|---|
| 2012/0203755 A1* | 8/2012 | Biran et al. | 707/706 |
| 2012/0203756 A1* | 8/2012 | Biran et al. | 707/706 |
| 2012/0203761 A1* | 8/2012 | Biran et al. | 707/713 |
| 2012/0203970 A1* | 8/2012 | Biran et al. | 711/128 |
| 2012/0204000 A1* | 8/2012 | Biran et al. | 711/202 |
| 2013/0282649 A1* | 10/2013 | Guanella et al. | 706/59 |
| 2014/0172766 A1* | 6/2014 | Van Lunteren | 706/48 |

OTHER PUBLICATIONS

Lunteren et al., "Hardware-Accelerated Regular Expression Matching at Multiple Tens of Gb/s", Mar. 2012, IEEE, pp. 1737-1745.*

Lunteren et al., "Regular Expression Acceleration at Multiple Tens of Gb/s", 2009, IEEE, pp. 1-8.*

* cited by examiner

SCANNING DATA STREAMS IN REAL-TIME AGAINST LARGE PATTERN COLLECTIONS

This invention was made with U.S. Government support under Contract. No. #H98230-07-C-0409 awarded by the National Security Agency. The U.S. Government has certain rights in the invention.

BACKGROUND

The present invention relates to the field of data processing, and more particularly relates to a pattern matching accelerator (PMA) and related sub-systems for use in high-speed pattern matching applications.

Current PMA systems utilize deterministic finite automaton (DFA) for high-speed patent matching. A DFA is a finite state machine that accepts or rejects finite strings of symbols and produces a unique computation or run of the automaton for each input string. A DFA may be illustrated as a state diagram but can be implemented in hardware or software. DFAs recognize a set of regular languages, which are formal languages that can be expressed using regular expressions.

In systems configured to perform massive regular expression matching at high speed, scaling problems may be observed that prevent known DFA processing techniques and functions from working efficiently. For example, regular expression scanners involving a few thousand patterns for virus or intrusion detection can be dramatically slowed as a growing number of new virus and intrusion patterns are added. As the size of the DFA grows, the memory required for storing state transitions in the DFA also increases. In many cases, the memory required for storing the state transitions span multiple memory structures, which can increase the time required to access various state transitions.

BRIEF SUMMARY

In accordance with an embodiment, a method for partitioning a deterministic finite automaton (DFA) into a plurality of groups, the DFA includes a plurality of states associated with one or more transition rules and each of the plurality of groups includes a plurality of rule lines. The method includes selecting, with a processing device, a subset of the plurality of states and mapping each state of the subset onto a group of the plurality of groups by assigning one or more transition rules associated with each state to a rule line of the group, wherein each rule line is assigned at most two transition rules and an extended address associated with one of the at most two transition rules. The method also includes iteratively processing each state of the subset mapped onto the group by removing the extended address from each rule line in the group with transition rules referring to a current state if the transition rules in the rule line branch within the group.

In accordance with another embodiment, a computer system for partitioning a deterministic finite automaton (DFA) into a plurality of groups, the computer system includes a memory having a DFA represented in a DFA data structure, the DFA including a plurality of states associated with one or more transition rules and each of the plurality of groups comprising a plurality of rule lines. The computer system also includes a processor configured to, select a subset of the plurality of states and map each state of the subset onto a group of the plurality of groups by assigning one or more transition rules associated with each state to a rule line of the group, wherein each rule line is assigned at most two transition rules and an extended address associated with one of the at most two transition rules. The processor is further configured to iteratively process each state of the subset mapped onto the group by removing the extended address from each rule line in the group with transition rules referring to a current state if the transition rules in the rule line branch within the group.

In accordance with another embodiment, a computer program product including a computer readable storage medium containing computer code that, when executed by a computer, implements a method for system for partitioning a deterministic finite automaton (DFA) into a plurality of groups. The method includes selecting, with a processing device, a subset of the plurality of states and mapping each state of the subset onto a group of the plurality of groups by assigning one or more transition rules associated with each state to a rule line of the group, wherein each rule line is assigned at most two transition rules and an extended address associated with one of the at most two transition rules. The method also includes iteratively processing each state of the subset mapped onto the group by removing the extended address from each rule line in the group with transition rules referring to a current state if the transition rules in the rule line branch within the group.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Many computing applications require scanning for groups of patterns in streams of data. For example, in the field of network security, network traffic is scanned for viruses and other types of network attacks. Patterns are developed to identify known attacks, and the incoming traffic is scanned for these patterns.

Rather than search for patterns one at a time, such applications usually group individual patterns into sets called pattern contexts. The application searches the data for all patterns in a pattern context simultaneously. Applications typically have many such contexts for scanning different types of data in the input data stream. This processing may be done by a gateway server, a dedicated network appliance or the computer that is the final destination of the network traffic. The gateway server or network appliance essentially interpose themselves between the computers on a local area network (LAN) and the outside world, guaranteeing a level of security for all computers on the LAN.

For most common protocols, such as TCP/IP, network traffic arrives in the form of packets. Packets from multiple data streams (or sessions) are usually interleaved, with each session being processed essentially independently. It is appreciated that numerous other applications of the PMA unit are possible, for example, text analysis applications, protein analysis applications, etc. The data in the packets are scanned against the patterns as they are received. This scanning can be executed by software, or a dedicated ASIC, FPGA or other computing device or chip. The patterns are supplied as some form of regular expressions, a well-known and well-developed class of pattern specification. There are many variations of regular expressions, but they typically provide means of specifying: string literals; case insensitivity; character classes (e.g., a digit, or an upper class letter); repetition (e.g., using quantifiers); and OR operations (i.e. match one of several possibilities). The patterns are compiled before the software or hardware uses them to scan the packet data. This involves converting the human-readable regular expression syntax into an internal form that the PMA can handle.

Figure 1:
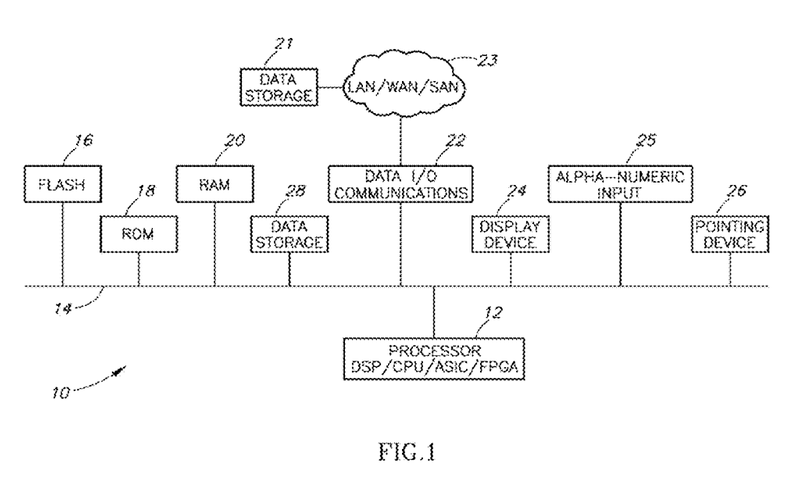
FIG. 1 is a block diagram illustrating an example computer processing system adapted to implement the pattern matching mechanism of the present invention.

A block diagram illustrating an example computer processing system adapted to implement the system and methods of the present invention is shown in FIG. 1. The computer system, generally referenced 10, comprises a processor 12 which may comprise a digital signal processor (DSP), 7 central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

As used herein, the term pattern is defined as a definition of a set of strings, where a string is defined as any sequence of symbols or bits, such as the ASCII character set, for example. One common example of a pattern is a regular expression which provides for matching strings of text, such as particular characters, words, or patterns of characters. A pattern context is defined as a set of patterns grouped together. A pattern context set is defined as a set of pattern contexts grouped together (i.e. a superset of pattern contexts).

As used herein the term "rule" is defined as a specification of a transition from one or multiple states to one next state within a state diagram or tree structure. A rule comprises a set of conditions defining the states and the input values for which the rule applies. This is denoted as the test part of the rule. A rule also comprises a result part which defines the next state. The result part may further include information associated with the next state, such as the hash information needed to search for a matching rule for the next state and a given input value, and, for example, a result flag indicating that the next state corresponds to the detection of a given pattern in the input stream. Further information may also be associated with a rule, for example, an instruction. Rules also have a priority assigned.

As used herein, the term "initial rule" is defined as a rule branching to the initial state, i.e. the initial rule's result part defines the initial state as next state. The term "default rule" is defined as a rule that is assigned as such by the pattern compiler or by other means, and which will be evaluated and selected if matched by the search engine when no matching transition rule has been found for a given current state. The term "transition rule" is defined as a rule that is neither an initial rule nor a default rule.

As used herein, the term "rules structure" is defined as a data structure that is comprised of rules and which is organized in such way that it can be executed by a search engine (SE). The rules structure may also comprise further information that is associated with the rules it contains, for example, instructions.

As used herein, the term "search engine" is defined as a programmable state machine implemented in hardware, software or a combination thereof. A search engine (also referred to as a pattern search engine) is programmed by providing/writing a rules structure in a memory that is accessed by the search engine. The search engine processes an input data stream by executing the given rules structure in the following way. For each consecutive input character in the input stream, the highest-priority rule is searched in the rules structure having a test part containing conditions that match the current state and the given input character. The next state defined in the found rule then becomes the new state of the search engine and is used to process the next input character.

Figure 2:
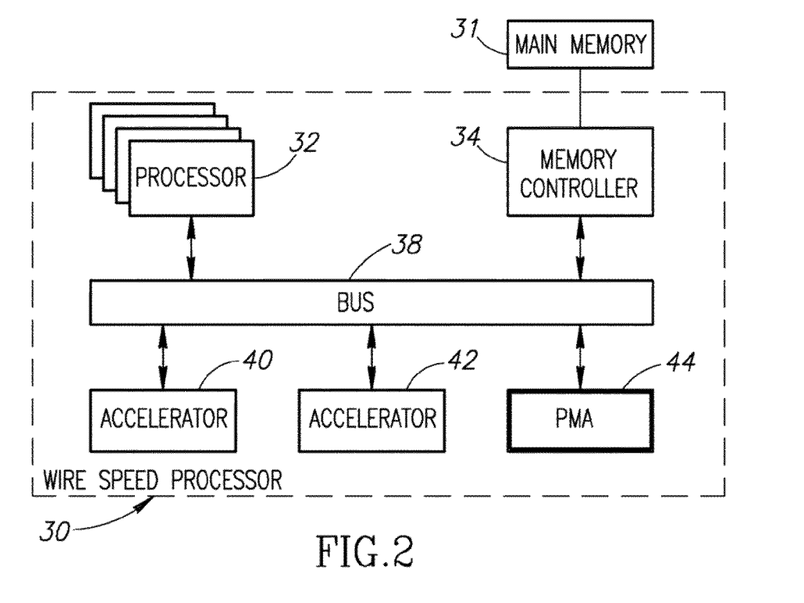
FIG. 2 is a high level block diagram illustrating the pattern matching coprocessor of the present invention in an example wire speed processor.

A high level block diagram illustrating the pattern matching processor of the present invention in an example wire speed processor is shown in FIG. 2. The example wire speed processor, generally referenced 30, comprises one or more general purpose CPU cores 32, a memory controller 34 coupled to main memory 31 (alternatively may be internal to processor 30), one or more accelerators 40, 42 and processor bus (or system bus) (Bus) 38. One of the accelerators comprises a pattern matching accelerator (PMA) 44 that is attached to the Bus. The PMA (also referred to as PMA unit or module) assists software threads to find the presence and location of strings in an input data stream that match a given pattern. The patterns are defined using regular expressions which are compiled into a data structure comprised of rules, also denoted as rules structure, subsequently processed by the search hardware.

Figure 3:
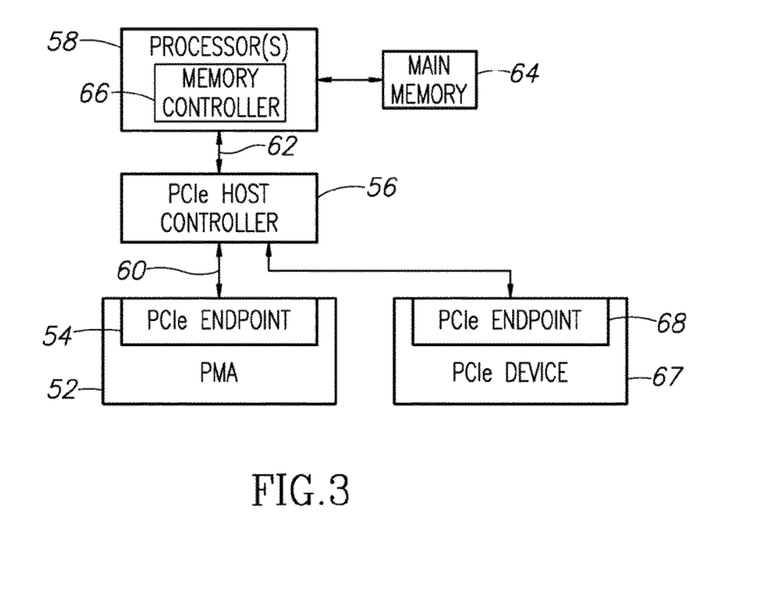
FIG. 3 is a high level block diagram illustrating an alternative embodiment of the pattern matching engine of the present invention as a stand alone component.

Note that in an alternative embodiment shown in FIG. 3, the PMA is implemented as a stand alone integrated circuit 52. In this embodiment, the PMA is attached to a PCIe endpoint controller 54 to form a PCIe attached accelerator that communicates over PCIe link 60, for example, with a host PCIe adapter 56 connected over a bus 62 to one or more processor(s) 58 (e.g., general purpose CPU core(s)). As an example a second PCIe device 67 is shown in communication with the processors 58 via PCIe endpoint 68 and PCIe host 56. The processors 58 communicate with main memory 64 via memory controller 66. It is appreciated that any suitable communication link, other than PCIe, could also be used without departing from the scope of the invention. In this embodiment, the structure of the PMA is the same as the PMA in FIG. 2.

The patterns to be searched in the input stream are defined by the user as a set of regular expressions. The patterns are grouped in pattern contexts. Each pattern context includes one or more patterns to be searched. The full set of pattern contexts to be used by the system at a given time defines a pattern context set. The sets of regular expressions which define the pattern context set are compiled by a pattern compiler to generate a rules structure used by the accelerator hardware. The rules are compiled before search run time and stored in main memory, in rule cache memory within the PMA, or a combination of the two.

The software thread sends an application search command from the processor directly to the accelerator to initiate a search. It is appreciated that the mechanism of the invention may use any suitable method of initiating a search and is not critical to the invention, for example, utilization of a command queue in memory from which the PMA reads commands. Once received, the command comprises a pointer to the input data on which the search is done, one or more identifiers of the pattern context to be searched on the given input data, a pointer to the match results output buffer and other parameters required for the operation of the PMA. The PMA reads the data, executes the search and returns the search results back to the software through an output buffer. At the end of the operation a status is returned and an optional additional status and/or completion notifications.

The PMA is based on the accelerator hardware as well as three associated software elements: (1) a regular expression compiler which functions to generate the hardware readable rules structure from the user defined regular expressions; (2) an upload manager which functions to manage a dynamic loading of rules into the PMA hardware local memory; and (3) API software that functions to format commands going to the PMA, interprets and post processes match results coming back from the PMA and manages data structures needed to communicate with the PMA (e.g., the output buffers). The compiler and upload manager software elements operate in the background of the normal PMA operation to allow dynamic updating and replacement of the pattern context set in use during run time.

The PMA is attached to the system bus through a Bus Interface Unit (BIU). The PMA is controlled by one or more software threads executing on one or more of the processor cores 32. The processor 32 defines a source buffer and an identifier of a set of patterns for a search, also referred to as a scan. Rules expressing the patterns to be searched are stored in local memory attached directly to the accelerator, or in the system memory. Upon completion of the search, information about any matches is returned, typically to the calling processor thread.

Example features of the PMA include (1) handling a rich set of regular expression features; (2) searching for multiple regular expressions (i.e., pattern contexts) in a single command which reads and processes the input characters and searches for regular expressions (patterns) in a single pass; (3) the ability to save and restore scan state, known as continuous search, to allow searching data which might be segmented to multiple network packets (such sequences referred to as a session), and supporting millions of simultaneously open sessions; (4) reporting all matches including reporting end position and supporting reporting of start match position; (5) wire speed processing providing high-speed pattern searching; and (6) relatively small chip real estate required in combination with no need for dedicated fast off-chip memory.

Figure 4:
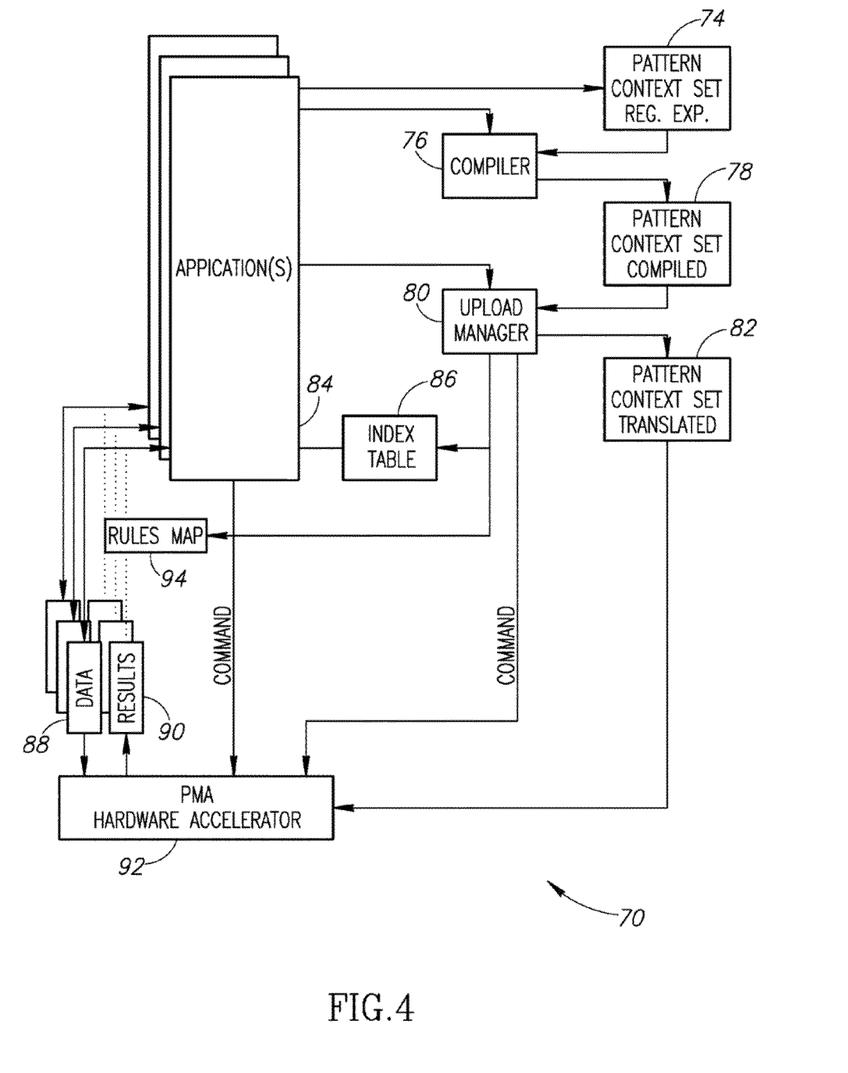
FIG. 4 is a high level block diagram illustrating the upload manager and PMA.

A high level block diagram illustrating the upload manager and PMA is shown in FIG. 4. The example circuit, generally depicted at 70, comprises applications 84, compiler 76 comprising upper and lower layers, pattern context set (i.e., regular expressions) 74, compiled pattern context set 78, upload manager 80, translated pattern context 82, PMA 92, index table 86, rules map 94 data 88 and results 90.

The applications 84 define the pattern context set to be complied. The communication is performed to a system dependent compiler upper layer. This layer calls the compiler lower layer which functions as the compilation and rule optimization engine. The compiler 76 generates a compiled pattern context set 78 and communicates the rule structure to the upload manager 80. The upload manager 80 may receive pre-defined rule usage statistics to allow it select an optimized initial setting of the PMA local memory from the application preliminary information. The upload manager initializes the PMA internal data structures, such as the classifier, PCH table, Global Address Translation Table, and the local rules in the local memory using upload manager commands. During run time the upload manager collects performance information from the PMA hardware to optimize performance by replacing the local rules with frequently accessed rules. The applications call the hardware services directly using application search commands.

In operation, at the time of initialization or when an update is required, one of the applications 84 defines the pattern context set (PCS) and sends the regular expressions to the compiler 76. The compiler 76 functions to receive as input a set of pattern contexts as regular expressions 74 (analogous to source code). The compiler runs once and compiles the pattern context set into a compiled set of pattern contexts 78 (analogous to object code). The compiler generates a PCS file containing the output files of the compiled PCS input and a rules map comprising the mapping between PMA states (i.e., reported match results) and the patterns. The upload manager 80 takes the compiled pattern context set 78 and translates it to a translated version of the pattern context set 82 (analogous to linked object code) for writing to main memory that is accessed by the PMA 92 in a form that the hardware can execute. Subsequently, some rules in main memory are written to the local rule area. The upload manager functions to generate the rules map 94 comprising (1) mappings from application pattern context identifiers to uploaded hardware pattern context identifiers, used by the application when submitting searches; and (2) match report decode information used by the application to decode match results into application pattern identifiers. The upload manager also initializes the PMA hardware using upload manager commands and maintains the PMA data structures during run time. The application sends search instructions to the PMA hardware via processor commands and the hardware returns coded match results which the application translates using the match report decode information in the Rules Map.

The pattern matching engine is based on a Finite State Machine (FSM) referred to as the search engine (SE) which in one embodiment, is optimized for hardware operation. In one embodiment, the search engine comprises a programmable state machine is referred to as a Balanced Routing Table search (BaRT)-based Finite State Machine or BFSM. The search engine is essentially a programmable FSM that stores the state transition rules in a large table. The rules structure obtained by compiling the pattern context set defines the transitions between the states, which are evaluated by the search engine to determine the next state to branch to after processing an input character (i.e., symbol or byte) in a data stream being received by the search engine.

The data stream received by the search engine comprises a series of bytes, which may be a continuous stream or may be in the form of data packets (as is common in Internet communication). The search engine scans the data stream for input strings that match specific patterns. The PMA engine is configured to pass the data stream to each search engine involved in the scanning operation, and further arranged to output a signal indicating a pattern match when a state transition rule executed by one of the search engines indicates a pattern match.

Figure 5:
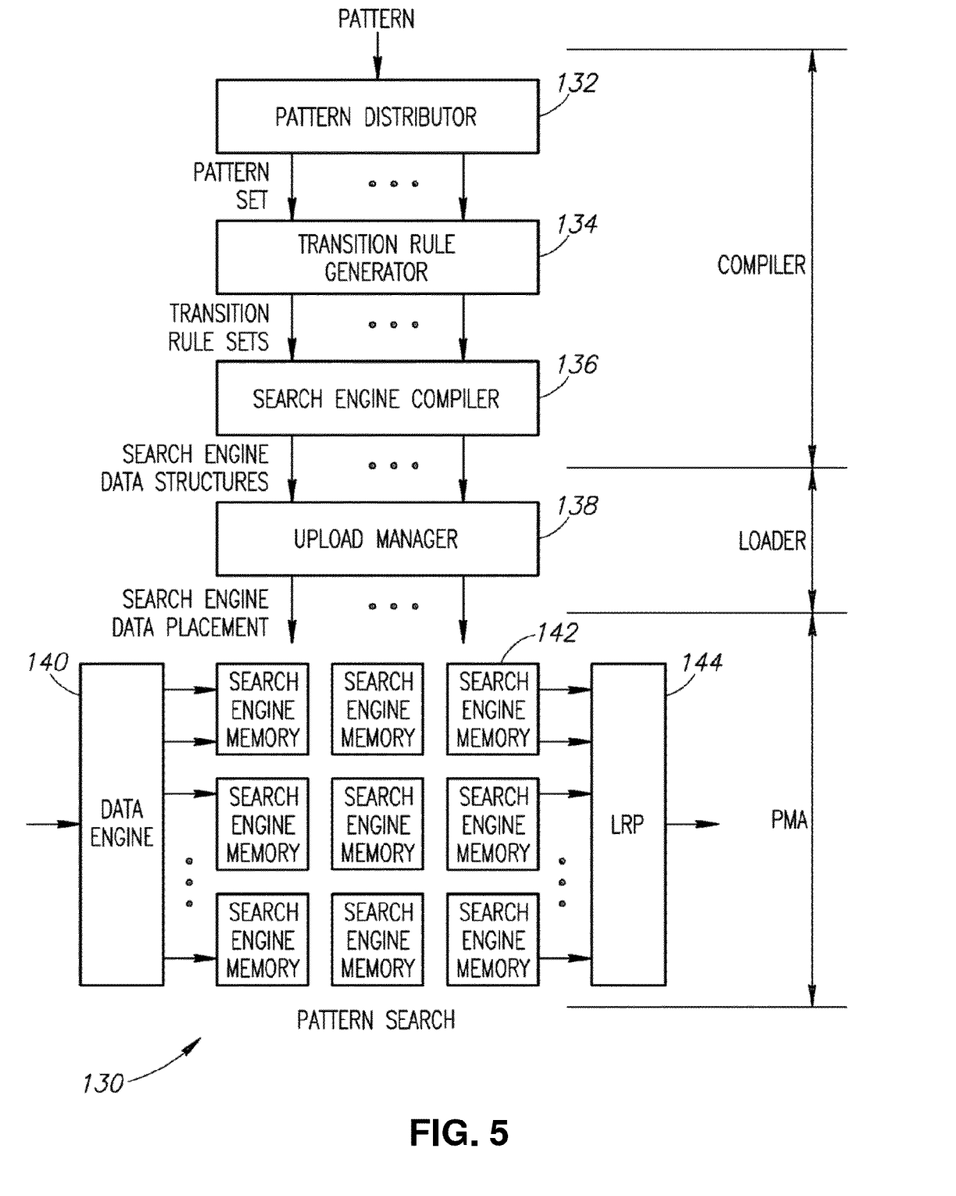
FIG. 5 is a diagram illustrating the compiler and associated loader and processing scheme.

A diagram illustrating the compiler and associated loader and processing scheme is shown in FIG. 5. The pattern context compilation scheme, generally depicted at 130, is divided into three portions, namely, a compiler portion comprising pattern distributor 132, transition rule generator 134 and search engine compiler 136; a loader portion comprising upload manager 138; and a hardware multi-threaded processing portion comprising pattern search mechanism including input controller 140, a plurality of search lanes each including a plurality of search engines and associated cache memory 142 and a results processor 144.

The pattern compiler functions to compile the input pattern context set, which is defined as regular expressions, into the set of binary rules processed by the PMA hardware. The pattern compiler has three main software building blocks: (1) a pattern distributor 132 distributes patterns over multiple pattern sets, based on pattern properties (conflicts, overlaps); (2) a transition rule generator 134 converts each pattern set into state transition rule sets; and (3) a search engine compiler 136 organizes transition rule sets into search engine data structures using state clustering, state encoding, and Balanced Routing Table (BaRT) search algorithm based compression.

The pattern contexts, expressed as regular expressions, are processed by a compiler. The compiler runs offline and functions to generate a rules structure, equivalent to the input regular expressions. The executable rules structure is processed by a set of hardware search engines, i.e., the search engines, inside the PMA. The rules structure is loaded into the PMA rule memory by the upload manager software which initializes the PMA hardware. The upload manager operates as a driver that controls the PMA. The upload manager also functions to monitor the operation of the hardware and loads the rules to optimize the performance of the PMA hardware.

Figure 6:
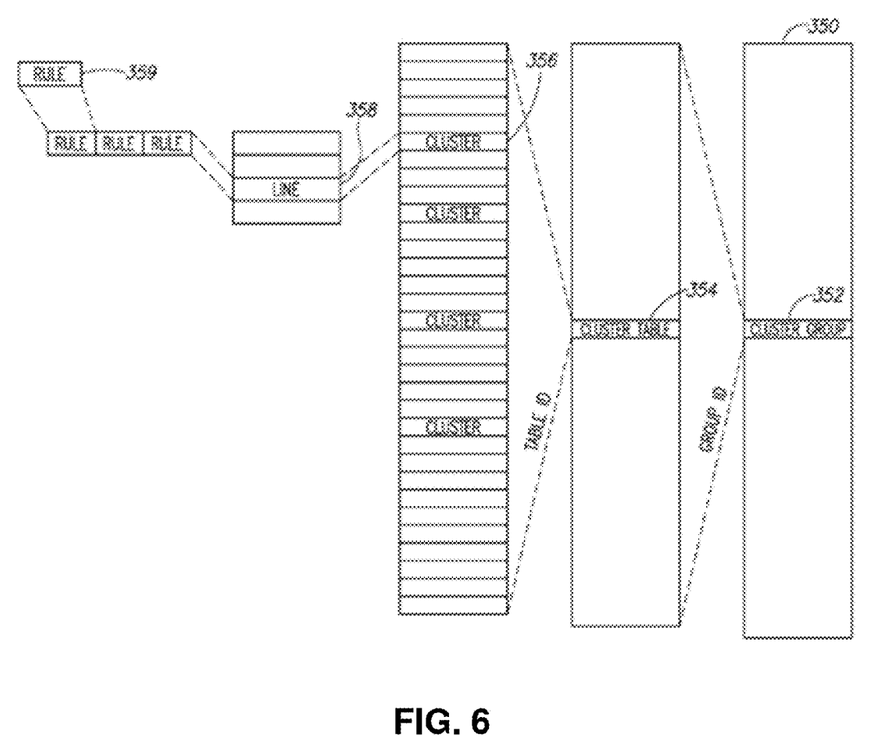
FIG. 6 is a diagram illustrating the organization of the storage used for transition rules.

A diagram illustrating the organization of the storage used for transition rules is shown in FIG. 6. Note that the organization shown in an example as the rules may be organized differently in accordance with the particular implementation. With reference to FIG. 6, the rules 259 are organized in lines 358, referred to as rule lines. Each rule line 358 comprises a plurality of rules 359 (e.g., three). The set of rule lines accessible by a single search engine state are known as a cluster. In an example embodiment, each cluster occupies between 16B and 2K bytes of memory. Clusters may be discontinuous and the size and location of a cluster is determined by the search engine state ID and mask, as described in detail infra. The clusters are further organized in cluster tables 354, also referred to as "tables", which have a fixed size. Multiple tables form a group 352 stored in memory 350.

Each rule is used to calculate the address of the next rule based on the value of the new byte from the input stream. A rule includes a cluster table ID, a pointer which points to the cluster table containing the rules of the next state. A rule can point to a rule set of a next state in the same table or to a rule in a different table. Tables are stored consecutively in memory by ID. The address of the first table, Table 0, in a pattern context is stored in the Pattern Context Header (PCH). Each of the four search engines uses a different set of tables in memory, and has a different address for Table 0. The search operation requires access to the rules every processed character. Therefore, fast access to the rules is preferable to achieve high search bandwidth. In one example embodiment, the PMA access rules every second cycle. In a first cycle, the rule is processed and in a second cycle, the new rule line is read. Both cycles are required for the processing of a single character.

Figure 7:
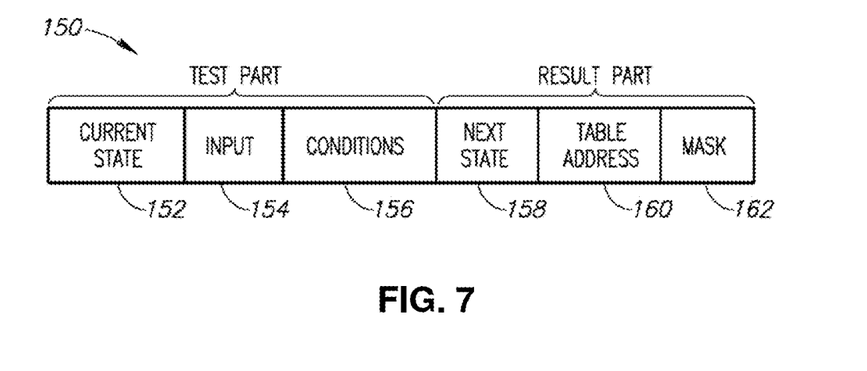
FIG. 7 is a diagram illustrating the format of an example rule line.

A diagram illustrating the format of a rule is shown in FIG. 7. The rule, generally depicted at 150, comprises a current state 152, input 154, conditions field 156, next state 158, table address 160 and mask 162. The test part of the rule functions to check that this rule applies to the current input character and search engine state. The results part of the rule functions to define the next state (i.e. new state) of the search engine if the test part passes successfully. The result part of rules that branch to a next state that corresponds to a match includes a so called result flag to indicate a match. Note that the invention includes alternative means of match reporting as well. The search engine reads new rules for every input character and updates the state register accordingly. Every cycle the search engine reads two new rule lines (e.g., each rule line comprises a plurality of rules (e.g., three)). One rule line is for the transition rules and the other rule line is for the default rules. The pattern search decision is made based on the information in both rule lines. The frequency of this cycle defines the maximal bandwidth of a single search engine.

Figure 8:
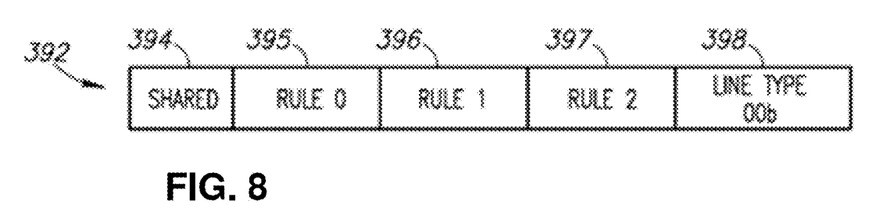
FIG. 8 is a diagram illustrating the structure of an example rule.

A diagram illustrating the structure of an example rule is shown in FIG. 8. In an example embodiment, each rule line, generally indicated at 392, comprises a plurality of bytes (or bits) in the rules memory and stores multiple rules 395, 396, 397 (e.g., three in this example). Each of the three rules comprises a plurality of bits. An effective rule encoding allows packing all basic fields within a rule in a storage-efficient way, while also providing a way to extend rules that need more fields or information.

Figure 9A:
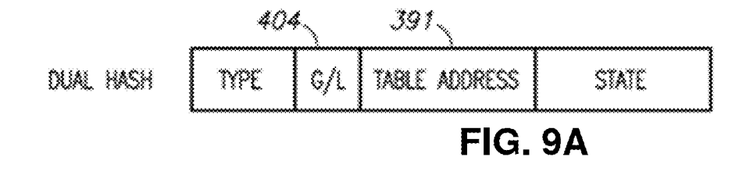
FIG. 9A is a diagram illustrating the format of the shared field in the case of dual hash.
Figure 9B:
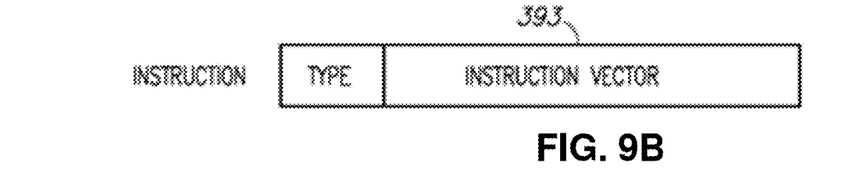
FIG. 9B is a diagram illustrating the format of the shared field in the case of an LRP instruction.
Figure 9C:
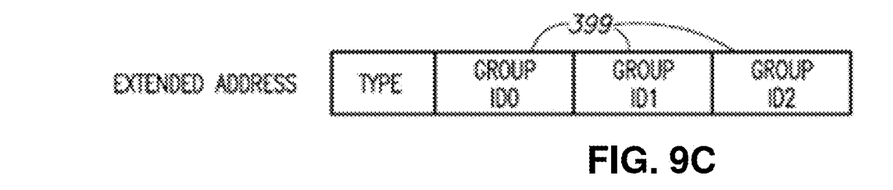
FIG. 9C is a diagram illustrating the format of the shared field in the case of an extended address.

In addition to the three rules, a shared field 394 (also referred to as a shared command field) holds information shared by all the rules in the rule line. The shared field can have a meaning of dual hash, a local result processor (LRP) instruction or an extended address. In the case of dual hash, the format of the shared field 394, shown in FIG. 9A, comprises a table address 391 and a global/local flag 404. In the case of a LRP instruction, the format of the shared field 394, shown in FIG. 9B, comprises an instruction vector 393. In the case of an extended address, the format of the shared field 394, shown in FIG. 9C comprises one or more group IDs 399. The extended address allows the search engine to switch to a different group. This enables to scale beyond the maximum number of states and rules that can be supported within a single group.

Figure 10:
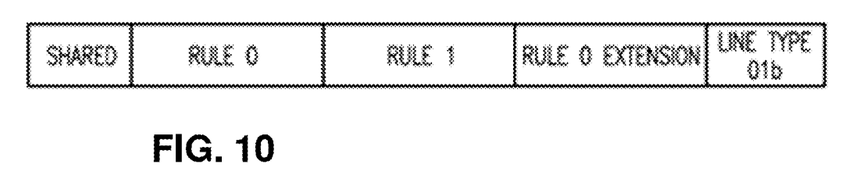
FIG. 10 is a diagram illustrating the structure of a rule line with an extended address.

The two least significant bits of the rule line may indicate that the rule line holds less than three rules allowing the addition of rule extension information to either one or both rules. The extended rule information is used in most cases as a command to the local result processor (LRP). A diagram illustrating the structure of a rule line with extended rules is shown in FIG. 10.

Figure 11:
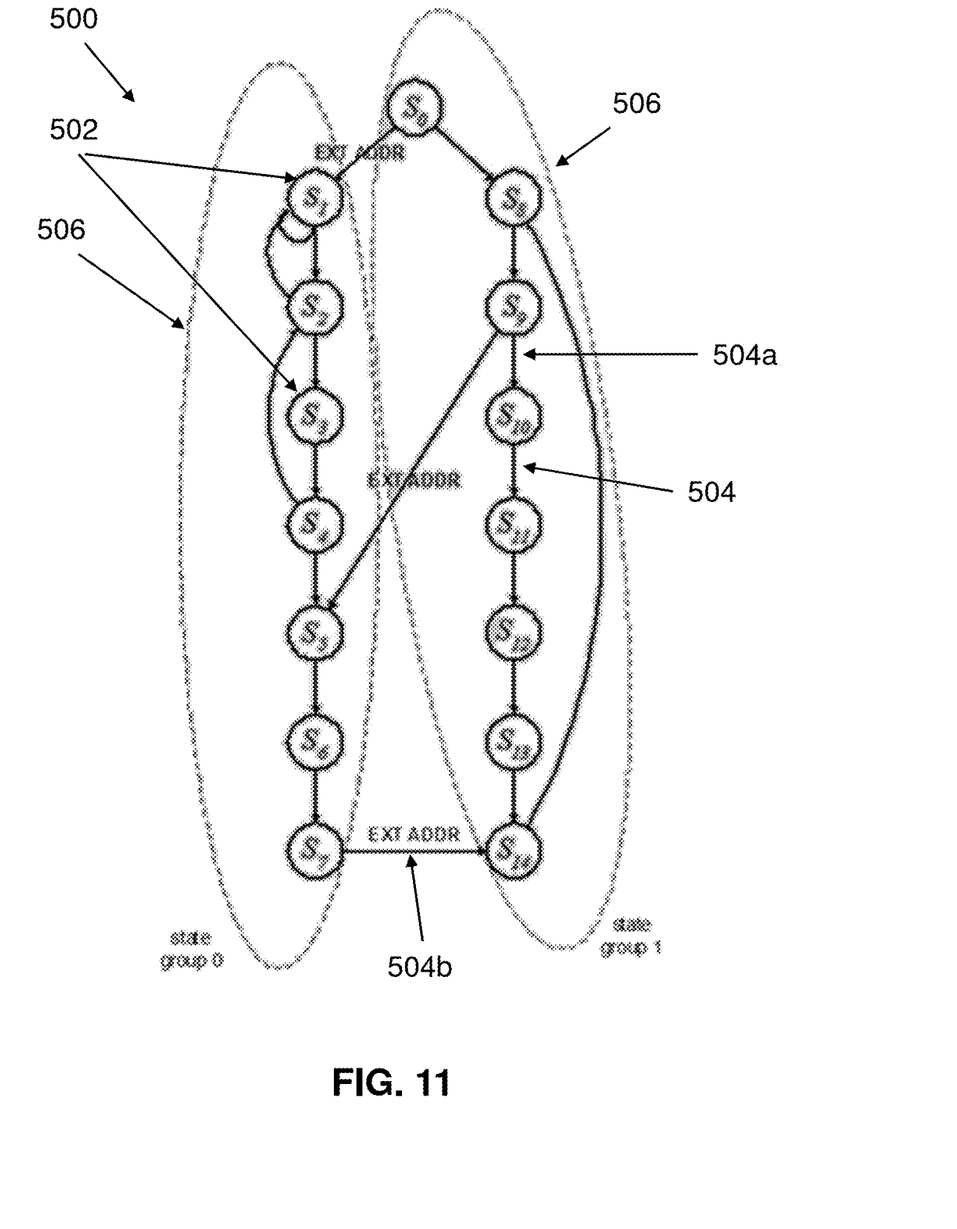
FIG. 11 is a diagram illustrating a DFA in accordance with an embodiment.

Referring now to FIG. 11, a diagram illustrating a simple DFA 500 in accordance with an embodiment is shown. The DFA 500 includes a plurality of states 502 which are connected by transitions 504, each transition being represented by a rule. As illustrated, the plurality of states 502 have been partitioned into two groups 506. In exemplary embodiments, the rules associated with each group 506 are stored in a separate memory group 352. The transitions 504 may be separated into two groups, local transitions 504a, which are transitions to states with the current group 506, and extended transitions 504b, which are transitions to states in a separate group 506.

As illustrated in FIG. 6, each rule line 358 may contain up to three rules 359. FIG. 8 illustrates a rule line 392 that contains three rules and FIG. 10 illustrates a rule line that contains two rules and an address extension used by at least one of the two rules. In cases where the rule line contains three rules, as shown in FIG. 8, all of the rules refer to an address in a single memory group 352. In cases where the rule line contains only two rules, at least one of the two rules refers to an address in a memory group 352 that is different from the current rule line 358. In exemplary embodiments, the time required to access a rule line 358 in a current memory group 352 is less that the time required to access an address of a rule line stored in a different memory group 352. Accordingly, it is preferable to maximize the number of rule lines 358 that contain three rules 359.

In exemplary embodiments, a method for partitioning a DFA into a plurality of groups is provided which maximizes the number of states in each group, subject to the size constraints of the memory group, and minimizes the number of extended transitions. By minimizing the number of extended transitions, the number of rule lines with three rules is increased, which increases the number of rules able to be stored in each memory group, and, thus, improves the storage efficiency. In addition, by reducing the number extended transitions, the increased access time associated with extended transitions can be avoided.

In exemplary embodiments, the method includes a merged DFA partitioning and compilation steps and requires only one basic compilation step per group, which results in a substantial reduction of the computational complexity. In addition, the method includes an initial selection function for selecting a set of candidate states that will be mapped to the same group, such that only a small number of extended addresses are needed.

In exemplary embodiments, the method for partitioning a DFA into a plurality of groups includes a conservative compilation step based on an initial assumption that transitions mapped on a given memory line will always branch to states in different groups, thus requiring an extended address. In one embodiment, the conservative compilation step assumes that at most two rules can be mapped on a given rule line, in order to have enough space for the extended address command as shown in the rule line configuration of FIG. 10. After the next states of all the transition rules for a given rule line have been compiled, a determination is made whether the next states reside within the current group. If the next states reside with the current group, the extended addresses are not necessary and the freed space becomes available for compiling an additional rule on that line. Otherwise, the extended addresses are necessary and are not removed.

In exemplary embodiments, the internal B-FSM data structure containing the states and transition rules also includes a reverse list for each state that includes the transition rules that branch to that state. Once a given state has been successfully mapped to a group, the reverse list is used to iterate over all transition rules that refer to that state. If a referring transition rule has already been mapped to a rule line, then the rule line(s) upon which that rule has been mapped will be checked to see if the extended addresses can be removed from the rule line. The extended addresses can be removed from the rule line when the source state of that transition rule is mapped within the current group. If the extended address can not be removed, the extended address field is updated based on the new group info.

In exemplary embodiments, the method for partitioning a DFA into a plurality of groups allows a fast and efficient update and/or removal of the extended addresses that have been mapped in a conservative fashion. In one embodiment, only rule lines that contain two transition rules mapped using the conservative mapping strategy are checked to determine if the extended address field can be removed and rule lines containing one or more empty rule vector are ignored.

In exemplary embodiments, the candidate state selection function selects a set of states that the merged partitioning and compilation function will try to map on to a single group. In one embodiment, the number of candidate states will be larger than the number of states that actually can be mapped, in order to maximize the filling of the tables within the group. As a result, one or more of the candidate states remain unmapped after the merged partitioning and compilation has been performed. These unmapped states may then be compiled into a different group. The objective of the selection function is to select the candidate states such that the number of transition rules branching to other candidate states in the same group is maximized. Maximizing the number of transition rules branching to other candidate states in the same group permits the removal of as many extended addresses as possible and maximizes the number of rule vectors that can be mapped on the available tables within the current group.

In exemplary embodiments, the candidate state selection may be performed only once per group and is not required to be optimal. However, a non-optimal selection will result in non-optimal storage efficiency because additional extended addresses are used that consume storage. In practice, the compiler can be configured to selectively weigh storage efficiency against compilation speed.

In one embodiment, the storage efficiency can be maximized by basing the candidate selection on a DFA partitioning using the Kernighan-Lin method, or some variation thereof. The Kernighan-Lin method will group most of the states together that branch amongst each other, minimizing the branches to other groups. The Kernighan-Lin method requires a lot of time and computing resources for the compilation.

In another embodiment, the compilation performance can be maximized by basing the candidate selection on a traversing method. The traversing method includes randomly selecting an initial set of states and the traversing the DFA by recursively following all the possible paths from each state, while collecting all the states that show up along the way. The DFA traversal can be guided by having certain limits, such as the maximum distance from the initially selected state(s). In one embodiment, reverse rule lists in the data structure also permit traversal in the other direction, by recursively collecting states that are branching to the selected candidate states.

Figure 12:
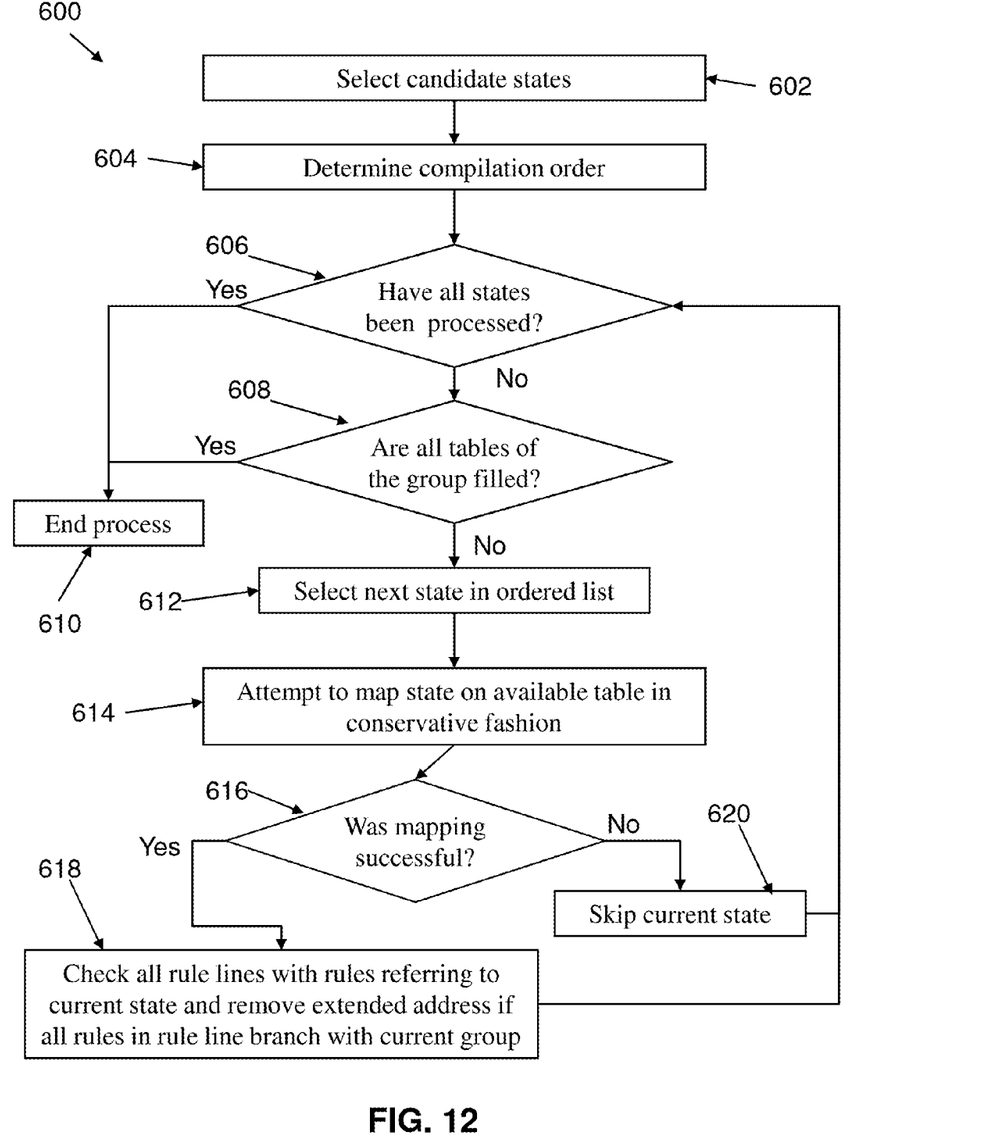
FIG. 12 is a flow diagram illustrating a method for partitioning a DFA into a plurality of groups in accordance with an embodiment.

Referring now to FIG. 12, a flow diagram illustrating a method 600 for partitioning a DFA into a plurality of groups in accordance with an embodiment is shown. The method 600 begins by selecting candidate states to be mapped to a group, as shown at block 602. Next, as shown at block 604, the method 600 includes determining the compilation order of the candidate states. As shown at decision block 606, the method 600 includes determining if all of the candidate states have been processed. Next, as shown at decision block 608, the method 600 includes determining if all of the tables of the group have been filed. Once all of the states have been processed or all of the tables of the group have been filed, the method 600 proceeds to block 610 and the method concludes. Otherwise the method 600 proceeds to block 612 where the next state in the ordered list is selected. After the next state is selected, the method 600 includes attempting to map the state on an available table in a conservative fashion, as shown at block 614. In exemplary embodiments, a conservative fashion includes mapping at most two transition rules on a given rule line. Next, as shown at decision block 616, the method 600 includes determining if the mapping was successful. If the mapping was successful, the method 600 proceeds to block 618 where all rule lines with transition rules referring to the current state are checked and the extended addresses are removed if all of the rules in the rule line branch within the current group. If the mapping was not successful, the method 600 proceeds to block 620 and the current state is skipped.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The invention claimed is:

1. A method for partitioning a deterministic finite automaton (DFA) into a plurality of groups, the DFA comprising a plurality of states associated with one or more transition rules and each of the plurality of groups comprising a plurality of rule lines, the method comprises:
   selecting, with a processing device, a subset of the plurality of states;
   mapping each state of the subset onto a group of the plurality of groups by assigning one or more transition rules associated with each state to a rule line of the group, wherein each rule line is assigned at most two transition rules and an extended address associated with one of the at most two transition rules; and
   iteratively processing each state of the subset mapped onto the group by removing the extended address from each rule line in the group with transition rules referring to a current state if the transition rules in the rule line branch within the group.

2. The method of claim 1, wherein each of the plurality of groups comprise a plurality of tables, each table at least one of the plurality of rule lines.

3. The method of claim 1, wherein the subset of selected states is larger than a storage capacity of the group.

4. The method of claim 1, wherein mapping each state comprises:
   selecting an initial state from the subset; and
   traversing the DFA by recursively following all of the transition rules associated with the initial state.

5. The method of claim 1, further comprising determining if all of the states of the subset have been processed.

6. The method of claim 1, further comprising determining if all of the rule lines of the group have been filed, wherein a filled rule line comprises three transition rules or two transition rules and an extended address associated with one of two transition rules.

7. A computer system for partitioning a deterministic finite automaton (DFA) into a plurality of groups, the computer system comprising:
   a memory comprising a DFA represented in a DFA data structure, the DFA comprising a plurality of states associated with one or more transition rules and each of the plurality of groups comprising a plurality of rule lines;
   a processor configured to:
      select a subset of the plurality of states;
      map each state of the subset onto a group of the plurality of groups by assigning one or more transition rules associated with each state to a rule line of the group, wherein each rule line is assigned at most two transition rules and an extended address associated with one of the at most two transition rules; and
      iteratively process each state of the subset mapped onto the group by removing the extended address from each rule line in the group with transition rules referring to a current state if the transition rules in the rule line branch within the group.

8. The computer system of claim 7, wherein each of the plurality of groups comprise a plurality of tables, each table at least one of the plurality of rule lines.

9. The computer system of claim 7, wherein the subset of selected states is larger than a storage capacity of the group.

10. The computer system of claim 7, wherein mapping each state comprises:
    selecting an initial state from the subset; and
    traversing the DFA by recursively following all of the transition rules associated with the initial state.

11. The computer system of claim 7, further comprising determining if all of the states of the subset have been processed.

12. The computer system of claim 7, further comprising determining if all of the rule lines of the group have been filed, wherein a filled rule line comprises three transition rules or two transition rules and an extended address associated with one of two transition rules.

13. A computer program product comprising a non-transitory computer readable storage medium containing computer code that, when executed by a computer, implements a method for system for partitioning a deterministic finite automaton (DFA) into a plurality of groups, wherein the method comprises:
    selecting, with a processing device, a subset of the plurality of states;
    mapping each state of the subset onto a group of the plurality of groups by assigning one or more transition rules associated with each state to a rule line of the group, wherein each rule line is assigned at most two transition rules and an extends address associated with one of the at most two transition rules; and
    iteratively processing each state of the subset mapped onto the group by removing the extended address from each rule line in the group with transition rules referring to a current state if the transition rules in the rule line branch within the group.

14. The computer program product of claim 13, wherein each of the plurality of groups comprise a plurality of tables, each table at least one of the plurality of rule lines.

15. The computer program product of claim 13, wherein the subset of selected states is larger than a storage capacity of the group.

16. The computer program product of claim 13, wherein mapping each state comprises:
   selecting an initial state from the subset; and
   traversing the DFA by recursively following all of the transition rules associated with the initial state.

17. The computer program product of claim 13, further comprising determining if all of the states of the subset have been processed.

18. The computer program product of claim 13, further comprising determining if all of the rule lines of the group have been filed, wherein a filled rule line comprises three transition rules or two transition rules and an extended address associated with one of two transition rules.

* * * * *